UNITED STATES PATENT OFFICE.

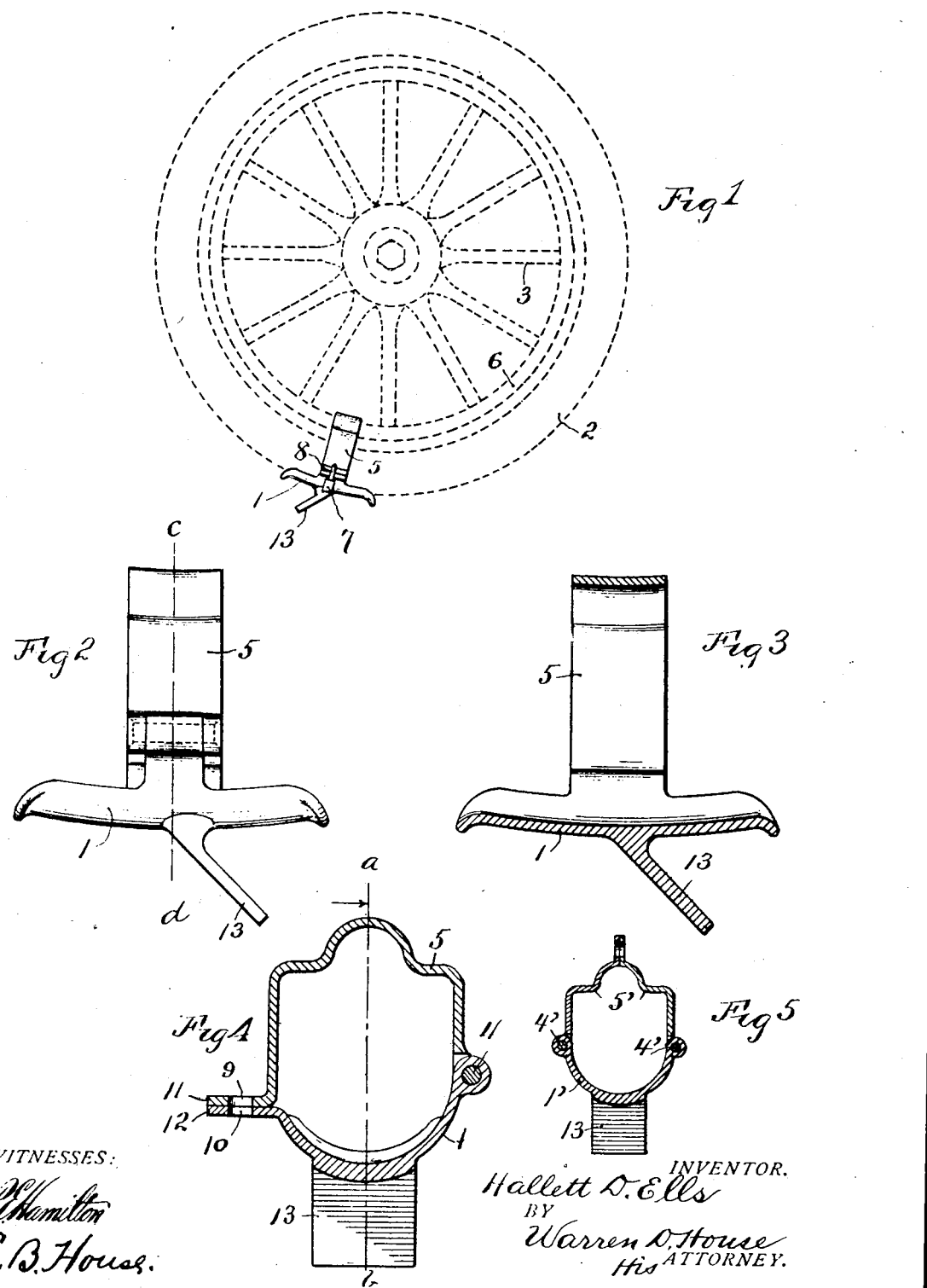

HALLETT D. ELLS, OF KANSAS CITY, MISSOURI, ASSIGNOR OF ONE-HALF TO EDWARD E. McKEE, OF KANSAS CITY, KANSAS.

CHOCK FOR VEHICLE-WHEELS. REISSUED

1,108,156.   Specification of Letters Patent.   Patented Aug. 25, 1914.

Application filed November 3, 1913. Serial No. 798,836.

*To all whom it may concern:*

Be it known that I, HALLETT D. ELLS, a citizen of the United States, residing at Kansas City, in the county of Jackson and State of Missouri, have invented certain new and useful Improvements in Chocks for Vehicle-Wheels, of which the following is a specification.

My invention relates to improvements in chocks for vehicle wheels.

It is particularly adapted for use on an automobile wheel.

The object of my invention is to provide a chock which is provided with means for being releasably locked to an automobile wheel for the purpose of preventing the wheel from revolving, and thereby preventing theft or unauthorized use of the automobile.

In the accompanying drawings which illustrate my invention, Figure 1 is a side elevation of the preferred form of my invention shown attached to an automobile wheel, the latter being in dotted lines. Fig. 2 is an enlarged side elevation of the chock shown in Fig. 1. Fig. 3 is a vertical sectional view on the line *a—b* of Fig. 4. Fig. 4 is a vertical sectional view on the line *c—d* of Fig. 2. Fig. 5 is a modified form of my invention provided with two clamping arms pivoted to opposite sides of the tread member.

Similar reference characters designate similar parts in the different views.

Referring to the first four figures, 1 designates the curved body of a tread member which is adapted to be fitted to the periphery of the tire 2 of an ordinary automobile wheel 3. Hinged to one side of the body 1 by means of a pintle 4 is a clamping member 5 which is adapted to embrace the rim 6 of the automobile wheel as shown in Fig. 1, and to have its free end releasably locked to the opposite side of the body 1 by means of a padlock 7, the hasp 8 of which is adapted to be inserted through two holes 9 and 10 provided respectively in laterally extending flanges 11 and 12 with which the members 5 and 1 are provided. Extending downwardly and preferably obliquely, from the underside of the body 1 is a projection 13 which is adapted to strike the ground and serve as a chock to prevent the wheel 3 being revolved, or in case that sufficient power is operated to cause the wheel to revolve, the projection 13 will cause the wheel to be raised from the ground and then permitted to drop during each revolution.

When the owner or operator of the automobile desires to use the same, the padlock 7 is removed, after which the member 5 may be swung so as to permit the chock to be removed from the wheel.

The ends of the body 1, as shown in the drawing, are preferably downwardly curved so as to prevent their cutting the tire 2.

In the form of my invention shown in Fig. 5, two arms 5' are respectively pivoted to opposite sides of the body 1' by means of two parallel longitudinal pintles 4'. The free ends of the arms 5' are provided respectively with holes therethrough for receiving the hasp of a padlock, such as is shown in Fig. 1. The body 1' is provided with downwardly and obliquely extending projection 13, corresponding in function and mode of operation to the corresponding part in the other form of my invention.

When the owner or operator of an automobile desires to leave the vehicle without guard he may apply to one of the wheels a chock corresponding to the one shown in Fig. 1 or that shown in Fig. 5, and releasably secure the same to the wheel by means of a suitable padlock, as hereinbefore described. If any unauthorized person attempts to use the vehicle the chock will interfere with the revolving of the wheel and will either prevent the running of the automobile, or by the irregular movement of the wheel will prevent rapid running of the machine and will serve to effect the detection of the person who attempts the unauthorized use of the vehicle.

Modifications of my invention, within the scope of the appended claims, may be made without departing from its spirit.

Having thus described my invention, what I claim and desire to secure by Letters Patent is,

1. A chock provided with a body adapted to engage the tread of the tire of a wheel, said body having a downwardly extending projection adapted to engage the ground for retarding revolving of the wheel, an arm pivoted to said body and adapted to be swung to a closed position in engagement with the rim of the wheel, and releasable means for locking said arm in the closed position.

2. A chock having a body adapted to clamp the tread of the tire of a wheel, said body having a downwardly and obliquely extending projection for engaging the ground, an arm pivoted to one side of said body and adapted to embrace the rim of the wheel for holding the body clamped to the tire, and releasable means for locking the free end of said arm to the opposite side of said body.

In testimony whereof I have signed my name to this specification in presence of two subscribing witnesses.

HALLETT D. ELLS.

Witnesses:
E. B. HOUSE,
HELEN W. HOUSE.